March 29, 1949.  J. G. ARAGONES  2,465,415
PACKING RING ARRANGEMENT FOR
COMBUSTION ENGINE PISTONS
Filed Dec. 30, 1947  2 Sheets-Sheet 1
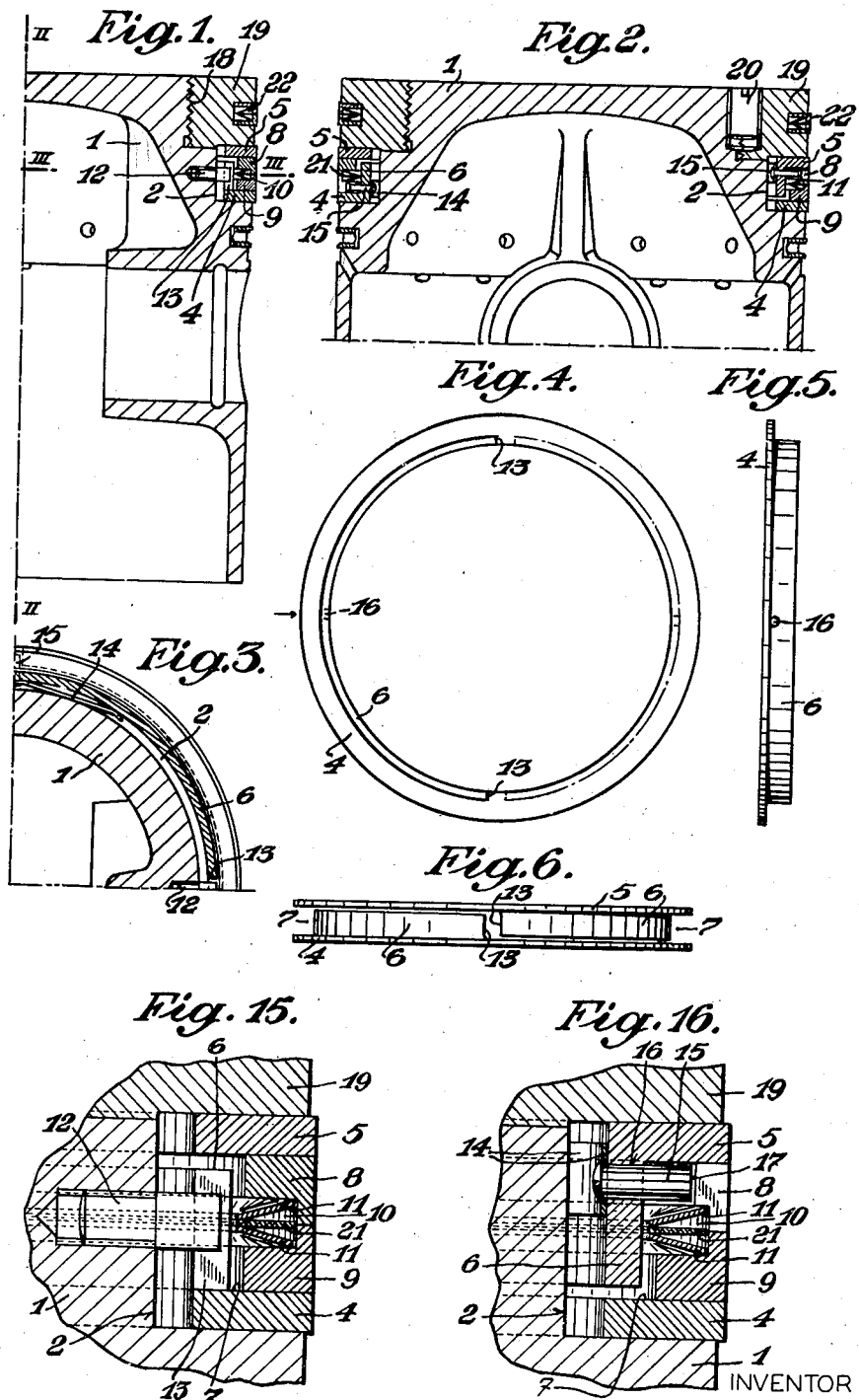
INVENTOR
JAIME GUARDIOLA ARAGONES
BY
AGENT March 29, 1949.  J. G. ARAGONES  2,465,415
PACKING RING ARRANGEMENT FOR
COMBUSTION ENGINE PISTONS
Filed Dec. 30, 1947  2 Sheets-Sheet 2
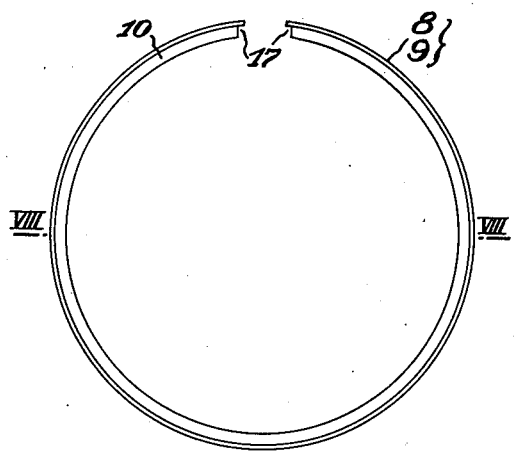
Fig. 7.
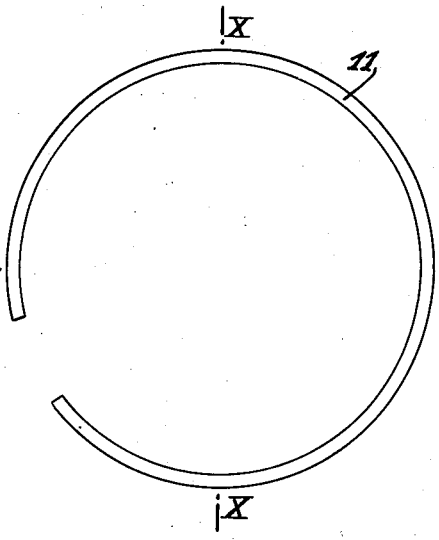
Fig. 9.
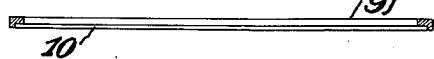
Fig. 8.
Fig. 10.
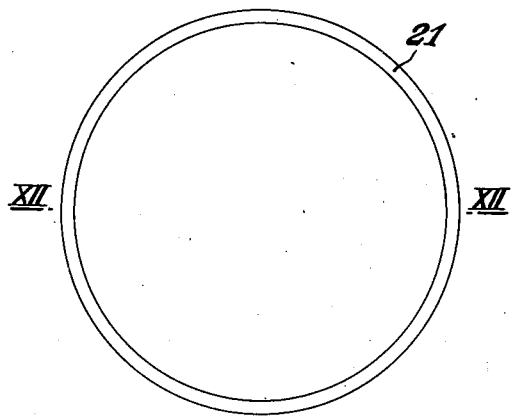
Fig. 11.
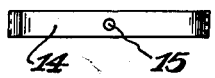
Fig. 13.
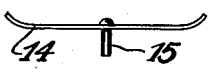
Fig. 14.
Fig. 12.
INVENTOR
JAIME GUARDIOLA ARAGONES
BY
AGENT Patented Mar. 29, 1949

2,465,415

UNITED STATES PATENT OFFICE 2,465,415

PACKING RING ARRANGEMENT FOR COMBUSTION ENGINE PISTONS

Jaime Guardiola Aragonés, Geneva, Switzerland, assignor to Alliance Europeenne, Societe Anonyme, Tanger (Zone of Tanger)

Application December 30, 1947, Serial No. 794,750
In Belgium August 28, 1946

6 Claims. (Cl. 309—22)

Section 1, Public Law 690, August 8, 1946

This invention relates to ring packing arrangements for combustion engine pistons, in which a split piston ring is lodged in a channel formed in an annular upsplit member of U-section adapted to slide radially in an annular piston groove, said piston being provided with suitable means enabling to place the said annular member in position.

According to the invention, the upsplit annular member of U-section comprises a pair of flat annuli having each an inner flange, extending over slightly less than 180°, so that when the two annuli are assembled to form the annular member the flange of either annulus comes to sit diametrically opposite the flange of the other annulus and engages the non-flanged sector of such other annulus, the channel formed by the inner surfaces of the said U-member being fitted with two split piston rings positioned in mutually adjoining relationship, said piston rings having interposed between them springs acting to urge the piston rings apart axially against the flat portions of the annular U-member and to press the latter portions against the adjacent walls of the piston groove. The invention further includes means for preventing angular shift of the annular member in the piston groove, means for preventing angular shift of the piston rings in the channel of the said annular member, and means for urging the two annuli of the said annular member apart radially in diametrally opposed directions.

One way of carrying out the invention will be hereinafter described with reference to the accompanying drawings, in which:

Fig. 1 is a fragmentary sectional view of a piston provided with the packing arrangement according to the invention.

Fig. 2 is a section on line II—II of Fig. 1.

Fig. 3 is a fragmentary sectional view on line III—III of Fig. 1.

Fig. 4 is a plan view, drawn to a smaller scale, of one of the component parts of the two-part annular of the packing arrangement according to the invention.

Fig. 5 is an elevation when looking in the direction of the arrow in Fig. 4.

Fig. 6 is an aggregate view of the double-part annulus carried out according to the invention.

Fig. 7 shows one of the piston rings of the packing arrangement, drawn to a still smaller scale.

Fig. 8 is a section on line VIII—VIII of Fig. 7.

Fig. 9 shows one of the annular springs of the packing arrangement.

Fig. 10 is a section on line X—X of Fig. 9.

Fig. 11 shows a flat ring member or washer adapted to be interposed between two springs of Fig. 9.

Fig. 12 is a section on line XII—XII of Fig. 11.

Fig. 13 is a plan view of another member of the packing arrangement; and

Fig. 14 is a side view of the member shown in Fig. 13.

Fig. 15 shows on a larger scale a detail of Fig. 1, and

Fig. 16 shows on a larger scale a detail of Fig. 2.

As shown in Figs. 1 to 3, the piston 1 of a combustion engine or compressor is formed with a peripheral groove 2 particularly suited to receive the packing arrangement of the invention, mounted for sliding radially therein. The arrangement comprises an annular member of U-section formed by two flat annuli 4 and 5, preferably of hard-light-weight metal, such as forged aluminum alloy, each provided with an inner flange 6 extending over an arc slightly smaller than 180°. Those annuli are mutually adjoining so that the flange of annulus 4 will be diametrically opposed to the flange of annulus 5 and will engage the non-flanged sector of the latter, and vice-versa, thus forming an annular member having a channel 7, as will be seen from Fig. 6 in which the assembly of the two annuli is shown.

Engaged in mutually adjoining position in channel 7, there are two split piston rings 8 and 9 (Figs. 7 and 8) having each a circular recess 10 adapted to receive a spring 11 (Figs. 9 and 10) in the form of a split ring made from thin sheet steel and shaped to a slight taper. Between the springs 11 there is interposed a washer 21 made from thin sheet.

When the piston rings fitted with their respective springs are inserted into the channel 7, the springs 11, the apices of which contact with the washer 21 exert a resilient action both axially and radially. In fact, on the one hand the elasticity of the springs 11 will act additionally to that of the piston rings 8 and 9 to press the latter against the internal face of the working cylinder, while on the other hand, and due to the small thickness of the said springs as compared with their width, the taper of the springs will become more marked when the edges of the slits of the springs draw nearer, on account of the contraction of the piston ring when inserted into the working cylinder. The increase in taper results in spreading the piston rings axially apart in mutually opposite directions, so as to maintain them resiliently in perfect contact with the adjacent flat walls of the annuli 4 and 5 and to ensure effective contact between the said annuli and the lateral walls of piston groove, thus providing quite a fluid-tight joint. The axial effect of the said springs, further precludes the hammering action of the said piston rings and annuli against the respective adjacent walls, such as may be due to the reciprocation of the piston in the cylinder.

The flat ring or washer 21 interposed between the springs 11 has the function of preventing the taper of either spring from being reversed by the effect of axial compression of such springs between the piston rings 8 and 9, which would result in cancelling the axial resilient effect of the said springs on the piston rings 8, 9.

The annuli 4 and 5 are held against rotary movement in the piston groove 2 by means of two pins secured in the bottom of the said groove at points located in the vertical plane passing through the axis of the piston, the heads of the pins protruding between adjacent ends 13 of the flanges 6 of the annuli 4 and 5 (Figs. 1, 3, 4 and 6).

Moreover, the annuli 4 and 5 lodged in the piston groove 2 are urged apart radially by springs 14 interposed between the bottom of the groove and the inner cylindrical face of the flanges 6 of the said annuli. Each spring 14 is provided midway of its ends with a pin 15 adapted to engage a hole 16 provided in the central portion of the flange 6 of each of the annuli 4, 5 (Fig. 5), the end of the said pin being further engaged either in a notch formed by cut-away portions 17 formed in the edges of each piston ring (Fig. 7)—where such engagement is made possible by the section of the piston ring—or directly between such edges.

Owing to the arrangement of parts provided by the packing assembly according to the invention, the slit of each piston ring of the assembly is at all times overlapped by the outer edge of the adjacent annulus so that, when the ovalization of the cylinder or the wear on the piston rings cause the slit of the latter to open out, the said annulus may act as a piston ring to secure perfect tightness of the piston.

The forged aluminum alloy used in making the annuli 4 and 5 provided a very hard metal that will better resist friction and show a smaller coefficient of friction, than cast iron. Furthermore, the annuli made from aluminum alloy show a high thermal conductivity, thus promoting abstraction of a great proportion of the heat evolved in the piston, towards the cooled cylinder wall, as in the case of a combustion engine.

To enable the packing assembly according to the invention, to be placed in position on the piston 1, the latter is formed at its upper end with a threaded portion 18 of reduced diameter, situated above the piston groove 2, the said reduced portion having screwed thereon a retaining ring 19 for the said assembly, the ring 19 being locked in position by a screw 20.

The segments 8, 9, together with the springs 11 and the washer 21, may also be advantageously fitted in the normal piston grooves, such as shown at 22 (Figs. 1, 2). In this instance the washer 21 will be slit similarly to springs 11, so that it may be inserted into the piston ring.

What I claim:

1. In a piston packing arrangement, a piston having an annular groove therein, an annular U-shaped section member moving with radial play in said groove and constituted from two independent rings each formed of a flat unsplit ring having an inner flange extending over an arc slightly smaller than 180°, said rings being assembled so that the flange of either ring comes to sit diametrally opposite the flange of the other ring and engages the non-flanged sector of such other ring, means to prevent the angular shifting of the U-member in the said piston groove, a channel formed by the inner surfaces of said U-shaped member, a pair of split piston rings in mutually adjoining relationship in said channel, resilient means interposed between said piston rings to urge the latter apart axially against the flat portions of the annular U-member and to press the latter portions against the adjacent walls of the piston groove, means to prevent the angular shifting of the piston rings in the channel of said annular member, springs interposed between the bottom of the piston groove and the adjacent face of the flange of either unsplit rings to urge the latter and their corresponding ring apart in diametrally opposed directions, and means associated with the piston for fitting the unsplit rings in the piston groove.

2. In a piston packing arrangement, a piston having an annular groove therein, an annular U-shaped section member moving with radial play in said groove and constituted from two independent rings each formed of a flat unsplit ring having an inner flange extending over an arc slightly smaller than 180°, said rings being assembled so that the flange of either ring comes to sit diametrally opposite the flange of the other ring and engages the non-flanged sector of such other ring, means to prevent the angular shifting of the U-member in the said piston groove, a channel formed by the inner surfaces of said U-shaped member, a pair of split piston rings in mutually adjoining relationship in said channel, annular recesses in the adjacent faces of said piston rings, spring means formed by two frusto-conical split washers of opposite taper, made from thin steel sheet, and engaged each in one of said annular recesses of the piston rings, a thin metal washer between said frusto-conical split washers, said spring means urging the piston rings apart axially against the flat portions of the annular U-member and pressing the latter portions against the adjacent walls of the piston groove, means to prevent the angular shifting of the piston rings in the channel of said annular member, spring means interposed between the bottom of the piston groove and the adjacent face of the flange of either unsplit rings to urge the latter and their corresponding ring apart in diametrally opposed directions and means associated with the piston for fitting the unsplit rings in the piston groove.

3. In a piston packing arrangement, a piston having an annular groove therein, an annular U-shaped section member moving with radial play in said groove and constituted from two independent rings each formed of a flat unsplit ring having an inner flange extending over an arc slightly smaller than 180°, said rings being assembled so that the flange of either ring comes to sit diametrally opposite the flange of the other ring and engages the non-flanged sector of such other ring, gaps formed between the adjacent ends of the flanges of the two flat unsplit rings, pins secured in diametrally opposed points in the bottom of the piston groove and projecting into said gaps, so as to prevent said annular U-member from shifting angularly in the said piston groove, a channel formed by the inner surfaces of said U-shaped member, a pair of split piston rings in mutually adjoining relationship in said channel, resilient means interposed between said piston rings to urge the latter apart axially against the flat portions of the annular U-member and to press the latter portions against the adjacent walls of the piston groove, means to prevent angular shifting of the piston rings in the channel of said annular member, springs interposed between the bottom of the piston groove and the adjacent face of the flange of either unsplit rings to urge the latter and their corresponding ring apart in diametrally opposed directions, and means associated with the piston for fitting the unsplit rings in the piston groove.

4. In a piston packing arrangement, a piston having an annular groove therein, an annular U-shaped section member moving with radial play in said groove and constituted from two independent rings each formed of a flat unsplit ring having an inner flange extending over an arc slightly smaller than 180°, said rings being assembled so that the flange of either ring comes to sit diametrically opposite the flange of the other ring and engages the non-flanged sector of such other ring, means to prevent the angular shifting of the U-member in the said piston groove, a channel formed by the inner surfaces of said U-shaped member, a pair of split piston rings in mutually adjoining relationship in said channel, resilient means interposed between said piston rings to urge the latter apart axially against the flat portions of the annular U-member and to press the latter portions against the adjacent walls of the piston groove, an opening provided in the central portion of the flange of each flat unsplit ring, a blade spring interposed between the bottom of the groove of the piston and the corresponding unsplit ring flange, a pin provided midway of said springs and adapted to project into the opening of the flange of the corresponding unsplit ring, said pin protruding radially between the edges of the split of the piston ring adjacent and means associated with the piston for fitting the unsplit rings in the piston groove.

5. In a piston packing arrangement, a piston having an annular groove therein, an annular U-shaped section member moving with radial play in said groove and constituted from two independent unsplit rings, a channel formed by the inner surfaces of said U-shaped member, a pair of split piston rings in mutually adjoining relationship in said channel, annular recesses in the adjacent faces of said piston rings, spring means formed by two frusto-conical split washers of opposite taper, made from thin steel sheet, and engaged each in one of said annular recesses of the piston rings, a thin metal washer between said frusto-conical split washers, said spring means urging the piston rings apart axially against the flat portions of the annular U-member and pressing the latter portions against the adjacent walls of the piston groove, spring means interposed between the bottom of the piston groove and either of said unsplit rings to urge the latter and their adjacent piston ring apart in diametrally opposed directions, means to prevent the angular shifting of said unsplit rings in the said groove and means associated with the piston for fitting the unsplit rings in the piston groove.

6. A piston packing arrangement as claimed in claim 1, characterized by the fact that unsplit rings forming the annular member of U-section are made from forged aluminum alloy.

JAIME GUARDIOLA ARAGONÉS.

No references cited.